(12) United States Patent
Alnuaimi

(10) Patent No.: US 12,356,905 B2
(45) Date of Patent: Jul. 15, 2025

(54) AQUAPONIC SYSTEM AND METHOD OF PLANT CULTIVATION

(71) Applicant: Mohamed Alnuaimi, Sharjah (AE)

(72) Inventor: Mohamed Alnuaimi, Sharjah (AE)

( * ) Notice: Subject to any disclaimer, the term of this patent is extended or adjusted under 35 U.S.C. 154(b) by 0 days.

(21) Appl. No.: 18/277,333

(22) PCT Filed: Jan. 19, 2022

(86) PCT No.: PCT/IB2022/050428
§ 371 (c)(1),
(2) Date: Aug. 15, 2023

(87) PCT Pub. No.: WO2022/180456
PCT Pub. Date: Sep. 1, 2022

(65) Prior Publication Data
US 2024/0114860 A1 Apr. 11, 2024

Related U.S. Application Data

(63) Continuation-in-part of application No. PCT/IB2021/051639, filed on Feb. 26, 2021.

(51) Int. Cl.
*A01G 31/02* (2006.01)
*A01K 1/03* (2006.01)
*A01K 61/10* (2017.01)

(52) U.S. Cl.
CPC .............. *A01G 31/02* (2013.01); *A01K 1/032* (2013.01); *A01K 61/10* (2017.01)

(58) Field of Classification Search
CPC .... A01K 63/04; A01K 63/045; A01K 63/042; A01K 63/047; A01K 61/00; A01K 61/60; A01K 61/17; A01G 2031/006; A01G 31/06; A01G 31/00; A01G 25/16; A01G 27/06; A01G 27/006; A01G 25/00; A01G 31/02; Y02P 60/60; C02F 2103/20; C02F 3/327; C02F 3/32; C02F 2203/00
USPC ....... 47/59 R, 62 E; 119/200, 227, 215, 226, 119/224, 9, 28, 202, 4
See application file for complete search history.

(56) References Cited

U.S. PATENT DOCUMENTS

| 2010/0065106 A1* | 3/2010 | Yekutiely | H01L 31/048 136/251 |
| 2015/0196002 A1* | 7/2015 | Friesth | A01G 7/045 315/297 |

(Continued)

*Primary Examiner* — Peter M Poon
*Assistant Examiner* — Marisa V Conlon
(74) *Attorney, Agent, or Firm* — Christopher Pilling

(57) ABSTRACT

There is disclosed a system and method of cultivating plants or crops, comprising a grow field configured to support plant or crop cultivation, the grow field comprising a first reservoir proximate to a first end of the grow field, configured to produce a waste nutrient stream, a second reservoir proximate to the second end of the grow field, wherein the second reservoir is configured to act as a settling tank for the produced waste nutrient stream; an Artificial Intelligence (AI) unit in connection with the grow field, first reservoir and the second reservoir for providing a feedback for improving a growth rate of the cultivated plants or crops; and a controller in communication with the AI unit for receiving output signals from at least one sensor and sending an assessment of monitored parameters to the AI unit, based on the processed output signals.

16 Claims, 5 Drawing Sheets

(56) References Cited

U.S. PATENT DOCUMENTS

| | | | |
|---|---|---|---|
| 2015/0230439 A1* | 8/2015 | Harwood | A01K 63/045 |
| | | | 119/227 |
| 2019/0062186 A1* | 2/2019 | Nickerson | C02F 3/327 |
| 2020/0000051 A1* | 1/2020 | Vincent | A01K 61/10 |
| 2021/0317022 A1* | 10/2021 | Cohen | C02F 3/327 |

* cited by examiner

AQUAPONIC SYSTEM AND METHOD OF PLANT CULTIVATION

FIELD OF THE INVENTION

The present invention relates to a system and method of cultivation of plants and crops, and more particularly an animal fertilizer based cultivation system.

BACKGROUND OF THE INVENTION

Background description includes information that may be useful in understanding the present invention. It is not an admission that any of the information provided herein is prior art or relevant to the presently claimed invention, or that any publication specifically or implicitly referenced is prior art.

In an agroponic system (an aggregate aquaponic systems), plant roots are supported in a solid and inert aggregate media and a nutrient solution is delivered directly to the plant roots. However, a challenge being currently faced is for maintaining a delicate balance within an agroponic system and to balance the number of fish and create a proper nutrient profile to fertilize the crops and trees. This includes the pH of the water, generating enough ammonia waste to act as a fertilizer, without generating enough waste to harm the fish, the salinity of the water, and other chemical and physical hazards that can upset this balance.

Crops and trees require water and nutrients in order to grow and produce fruits. In traditional farming, water comes from rain and from man-made irrigation. The nutrients come from chemical or natural fertilizers, and from the soil itself. When the soil is depleted of nutrients, it must be artificially fertilized, allowed to fallow, or remain idle for some time for the soil to naturally regain nutrients. Some crops, such as cotton, corn and sweet potatoes, deplete the soil very rapidly. Farmers must rotate crops and let the fields fallow frequently. However, the aquaponic process is not effective enough to provide a full range of nutrients required by larger fruiting trees as well as some field crops in a large scale agroponic system.

Therefore, there exists a need for a solution for the above listed drawbacks associated with traditional crop/plant cultivation systems, and which proves to be a remedy for the same.

SUMMARY OF THE INVENTION

Therefore it is an objective of the present invention to propose an animal waste based cultivation system and method, which overcomes the drawbacks associated with the above mentioned traditional crop/plant cultivation systems. The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

In an aspect of the invention, a system for cultivating plants or crops, comprising a grow field configured to support plant or crop cultivation, the grow field comprising a first end, a second end, a bottom surface and a boundary wall, a first reservoir proximate to the first end of the grow field, wherein the first reservoir is configured to produce a waste nutrient stream; a second reservoir proximate to the second end of the grow field, wherein the second reservoir is configured to act as a settling tank for the produced waste nutrient stream, an Artificial Intelligence (AI) unit in connection with the grow field, first reservoir and the second reservoir for providing a feedback for improving a growth rate of the cultivated plants or crops; and a controller in communication with the AI unit for receiving and processing output signals from at least one sensor and sending an assessment of a plurality of monitored parameters to the AI unit, based on the processed output signals.

In an embodiment of the present invention, the system further comprises a first pump positioned in the first reservoir, a first conduit in fluid connectivity with the first pump and the second reservoir, a second pump positioned in the second reservoir, a third pump positioned in the second reservoir, a second conduit in fluid connectivity with the second pump and a bio filtration system, a third conduit in fluid connectivity with the bio filtration system and the first reservoir; and a fourth conduit in fluid connectivity with the third pump and the grow field.

In another embodiment of the present invention, the first reservoir is configured to hold a plurality of fish and the produced waste nutrient stream comprises fish waste.

In another embodiment of the present invention, the first reservoir is in connection with a sump tank positioned proximate to a livestock or rabbit shed, which is configured to store manure and urine from the livestock or rabbits.

In another embodiment of the present invention, the produced waste nutrient stream is manure and urine from the livestock or rabbits diluted in water.

In another embodiment of the present invention, a growth medium within the grow field is an aggregate material used as a replacement for soil, the aggregate medium being a hydroponic medium.

In another embodiment of the present invention, the plurality of monitored parameters comprises levels of requisite nutrients in the growth medium, temperature, transpiration, humidity, pH, water conductivity, dissolved oxygen, dust, presence of pests or insects.

In another embodiment of the present invention, the hydroponic medium comprises coconut coir, perlite, vermiculite, rock wool, expanded clay or gravel.

In another embodiment of the present invention, the at least one sensor continuously monitors the levels of requisite nutrients in the growth medium.

In another embodiment of the present invention, the at least one sensor is a soil nutrient sensor, optical sensor which function using reflectance spectroscopy, an electromagnetic sensor, and/or a dust sensor.

In another embodiment of the present invention, the first, second, third and fourth conduits are submerged and function underground for regulating a temperature of water circulated via the first, second, third and fourth conduits.

In another embodiment of the present invention, the feedback provided by the AI unit comprises an indication regarding detected low levels of nutrients in the growth medium or an indication to increase or reduce overall water circulation rate.

As another aspect of the present invention, a method of cultivating plants or crops is disclosed, the method comprising the steps of providing a grow field configured to support plant or crop cultivation, continuously pumping a waste nutrient stream to the grow field, wherein the waste nutrient stream provides nourishment and acts as a fertilizer for the plants or crops; providing a feedback for improving a growth rate of the cultivated plants or crops using an Artificial Intelligence (AI) unit in connection with the grow field; and receiving and processing output signals from at least one sensor using a controller in communication with the AI unit and sending an assessment of a plurality of monitored parameters to the AI unit, based on the processed output signals.

In another embodiment of the present invention, a bio filtration system is configured to break down the waste nutrient stream via *nitrobacter* bacteria.

In another embodiment of the present invention, the first reservoir is configured to hold a plurality of fish and the produced waste nutrient stream comprises fish waste.

In another embodiment of the present invention, the first reservoir is in connection with a sump tank positioned proximate to a livestock or rabbit shed, which is configured to store manure and urine from the livestock or rabbits.

In another embodiment of the present invention, the produced waste nutrient stream is manure and urine from the livestock or rabbits diluted in water.

In another embodiment of the present invention, the feedback provided by the AI unit comprises an indication regarding detected low levels of nutrients in the growth medium or an indication to increase or reduce water circulation rate.

In another embodiment of the present invention, the system further comprises a plurality of floating solar panels installed on the first and second reservoirs of the system for generating solar energy and for regulating temperature of water circulated through the system, and a tent positioned over the grow field, the first and the second reservoir for condensing any evaporated water.

In another embodiment of the present invention, the system further comprises an external seedling system comprising a plurality of grow-beds wherein seeds are sown initially, and are transplanted to the grow field once sprouted, for enhancing overall productivity of the grow field.

In another embodiment of the present invention, the bottom surface of the grow field is sloped from a second end to a first end enabling water to flow and fill the grow field from the second reservoir.

In another embodiment of the present invention, the system further comprises an air blower and a plurality of air stones positioned in the first and second reservoirs, wherein the plurality of air stones are configured to continuously oxygenate the water.

In another embodiment of the present invention, the water circulation is continuous and in a clockwise direction.

BRIEF DESCRIPTION OF THE DRAWINGS

The subject matter that is regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

DETAILED DESCRIPTION OF THE INVENTION

The aspects of an animal waste based system and method for cultivation of plants and crops, according to the present invention will be described in conjunction with FIGS. 1-9. In the Detailed Description, reference is made to the accompanying figures, which form a part hereof, and in which is shown by way of illustration specific embodiments in which the invention may be practiced. It is to be understood that other embodiments may be utilized and logical changes may be made without departing from the scope of the present invention. The following detailed description, therefore, is not to be taken in a limiting sense, and the scope of the present invention is defined by the appended claims.

Aquaponics is a variation of hydroponics, where crops and trees are grown without soil and enables aquaculture or the raising of aquatic life. In aquaponics, fish and other aquatic life generate waste, which is then used as nutrients to grow crops and trees. Grown hydroponically or through aquaponics, crops and trees are constantly exposed to nutrient-rich water, without the need to rotate crops round the year. Aquaponic systems that grow micro greens, lettuce, tomatoes etc. are short cycle crops which do not require complex nutrients seasonally and wherein solely fish waste is sufficient for their growth cycle (which can be as short as 45 days). However, larger crops and trees require a different nutrient delivery throughout the varying seasons—during growth, fruiting, shedding etc. Hence the importance of a second source of nutrients with a wider variety of nutrition. Traditionally proposed aquaponic processes are not effective enough to provide a full range of nutrients required by larger fruiting trees as well as some field crops in a large-scale agroponic system. The present invention discloses a solution to this problem by adding organic matter or compost directly into the grow field mixed in with the aggregate.

Figure 1:
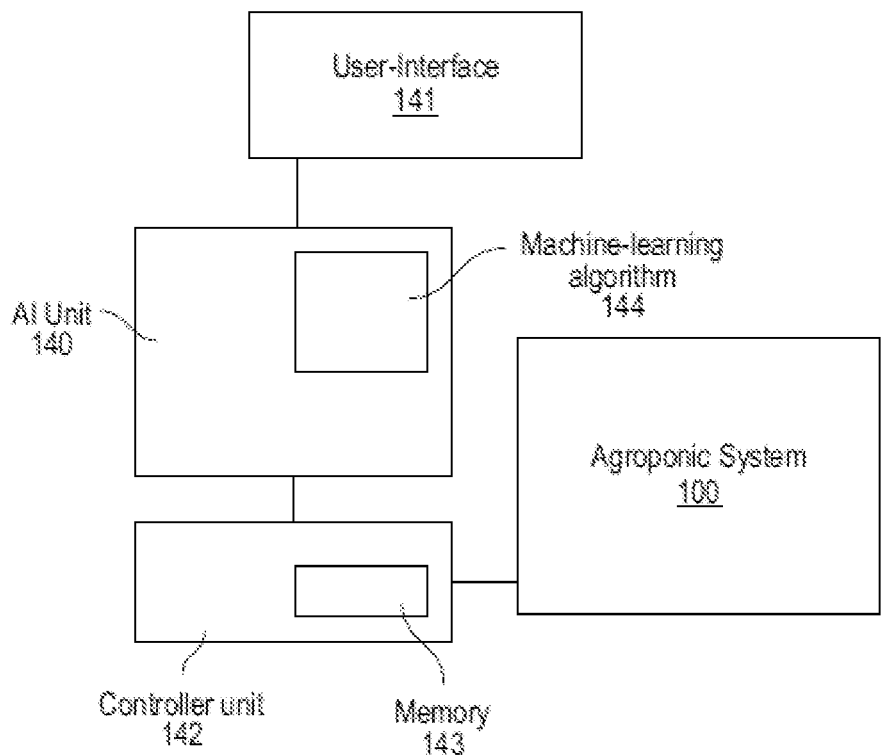
FIG. 1 is a block diagram of a primary embodiment of an animal waste based cultivation system in accordance with the present invention.

As depicted in FIG. 1, the proposed cultivation system aims for enabling healthy root growth for all cultivated plants or crops round the year, irrespective of the weather conditions or environmental conditions—by continuously monitoring the cultivated plants or crops using an Artificial Intelligence (AI) unit 140 in connection with a machine-learning algorithm 144—based on a number of parameters and providing a feedback for improving or maintaining a desired growth rate for the cultivated plants or crops. The functioning of the machine learning algorithm 144 involves defining an objective (for example, it is an objective of the present invention to constantly maintained the ground temperature at a nominal temperature of 21-29° Celsius round the year to enable healthy root growth), gathering data (obtaining measured parameter values measured or recorded using a plurality of sensors), cleaning and exploring the gathered data (eliminating redundant or unnecessary data values), modeling the data (using unsupervised or reinforcement learning models, wherein the machine learning algorithm 144 learns continually from its environment by interacting with the environment and parameters measured from the environment in this case), evaluating the model and providing an output (an assessment of the monitored parameters are continually conveyed to the AI unit 140). The AI unit 140 is operatively connected with a controller (microcontroller or microprocessor) 142 with a memory component 143, and all monitored parameter values are recorded and saved in the memory 143 of the controller 142, to be used and processed by the machine learning algorithm 144.

In an embodiment, the machine learning process continuously collects data pertaining to the parameters—pH levels, water conductivity, dissolved oxygen levels, water temperature, humidity, Carbon dioxide ($CO_2$), air temperature, etc., while also continuously monitoring the plant growth yield size and color changes via a camera sensor. Water consumption of each tree, crop or plant is calculated and derived (considering a controlled environment with minimal or negligent water evaporation). The various type of data collected then allows the AI unit to predict growth cycles and predict optimum parameters for growth those growth cycles.

In an embodiment of the present invention, the proposed cultivation system 100 functions as a fully organic system.

The parameters measured from the environment include, but are not limited to, amount or a level of nutrients in the growth medium (or soil), pH levels of the growth medium, temperature, transpiration, humidity, dust, presence of pests or insect, etc. The plurality of sensors used for measuring or recording these parameter values include, but are not limited to, soil/growth medium nutrient sensors, optical sensors which function using reflectance spectroscopy and/or electromagnetic sensors, temperature sensors, humidity sensors, and/or dust sensors. The memory 143 of the controller 142 used is capable of retaining all recorded parameter values and assessment data, thereby providing an added advantage of being able to access crucial data from the past (for example accessing stored data values from 5 years ago), which also helps in making future decisions or changes in the proposed system, for further promoting or sustaining plant or crop growth.

Accordingly, once the assessment of the monitored parameters is received by the AI unit 140, the data is analyzed by the AI unit 140 and a feedback is provided regarding an action which needs to be taken to ensure or maintain healthy plant or root growth, for example, increase or reduce water circulation rate, more nutrients required, etc. The feedback provided by the AI unit 140 comprises either an indication that all necessary nutrients are currently available to the roots or raising red flags regarding detected low levels of nutrients in the growth medium or an indication to increase or reduce overall water circulation rate. The feedback from the AI unit 140 is displayed or visible via a user-interface unit 141.

In order to ensure that a full range of nutrients are provided for the plants or crops being cultivated, the present invention focusses on using animal waste as a fertilizer within the growth medium. The animal waste being used may include but is not limited to rabbit waste, waste from cattle or livestock, fish waste.

Figure 2:
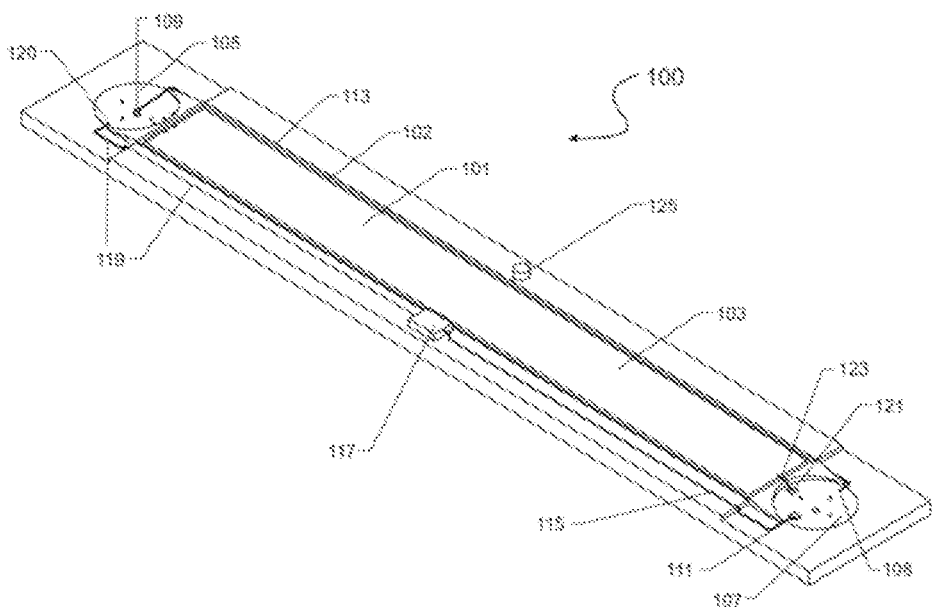
FIG. 2 is a perspective view of an animal waste based cultivation system according to an embodiment of the present invention.

FIG. 2 is a perspective view of the animal fertilizer based cultivation system 100 according to an embodiment of the present invention. In one embodiment, the cultivation system 100 comprises a grow field 101 having a boundary wall 102, a first reservoir 105, and a second reservoir 107. In one embodiment, the grow field is a single grow field. In alternative embodiments, the grow field comprises multiple grow fields 101 and 103, wherein the grow fields are in fluid communication. The height of the boundary wall 102 may vary depending on the desired volume of water enabled in the grow field 101. In one embodiment, the boundary wall 102 is constructed from concrete however any suitable materials may be used. In an embodiment, the grow field is rectangular in shape, however it should be understood that the shape may change without departing from the spirit or scope of the invention. The rectangular shape provides a space saving design where many similar systems may be provided in rows. Although the size of the system may vary, it is intended to be a large system approximately 200 meters in length covering an acre (or 2-5 acres) of space.

Figure 3:
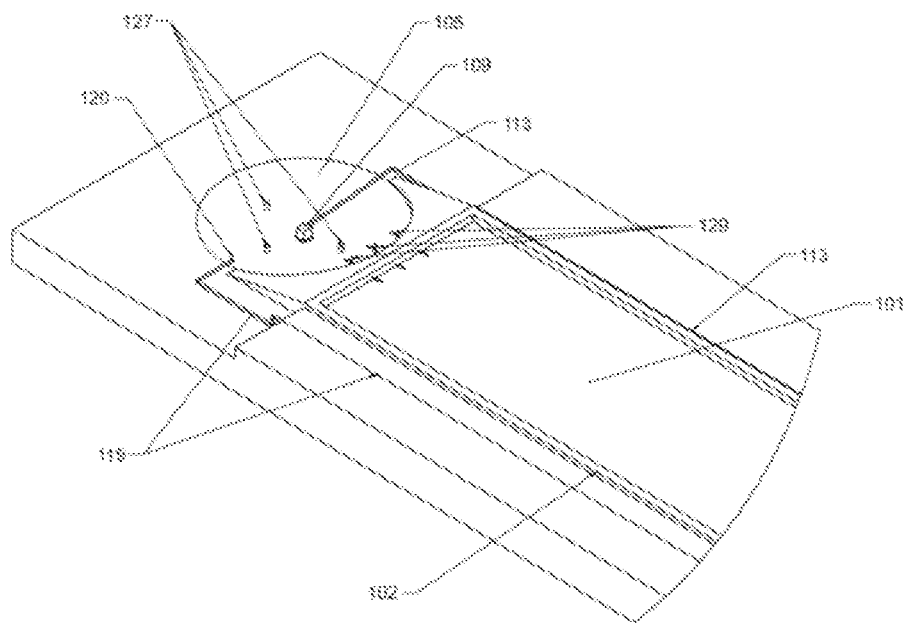
FIG. 3 is a detailed perspective view of a first reservoir of the animal waste based cultivation system according to an embodiment of the present invention.
Figure 4:
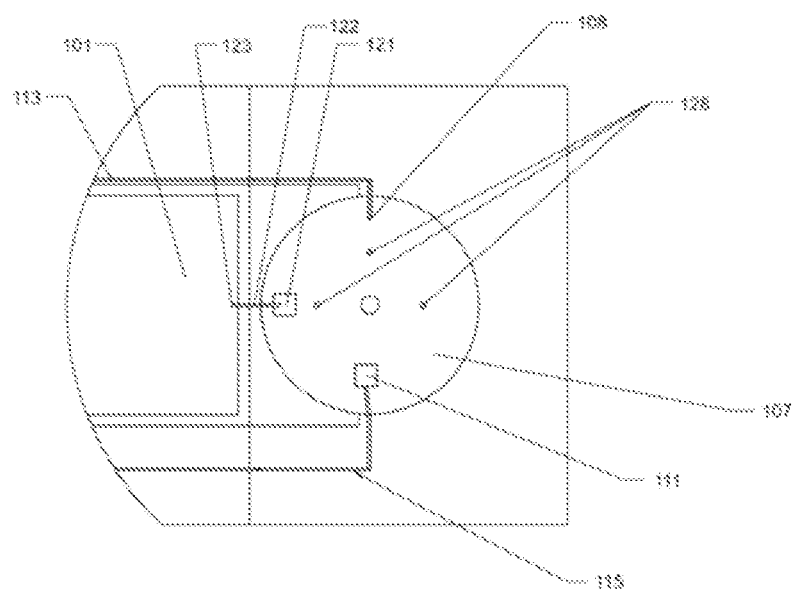
FIG. 4 is a detailed top view of a second reservoir of the animal waste based cultivation system according to an embodiment of the present invention.
Figure 5A:
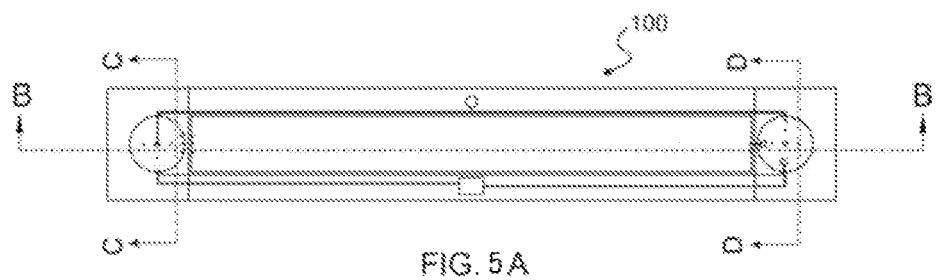
FIG. 5A is a top view of the animal waste based cultivation system according to an embodiment of the present invention.
Figure 5B:
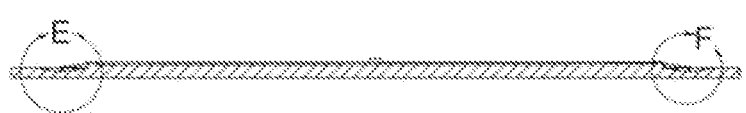
FIG. 5B is a section view taken along section B-B of FIG. 5A.
Figure 5C:
FIG. 5C is a section view taken along section C-C of FIG. 5A.
Figure 5D:
FIG. 5D is a section view taken along section D-D of FIG. 5A.
Figure 5E:
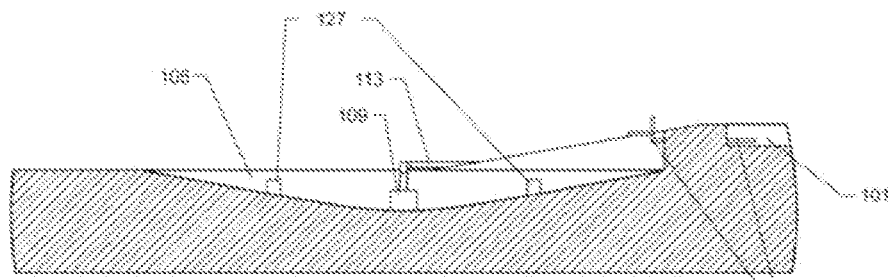
FIG. 5E is a detailed view of detail E of FIG. 5B.
Figure 5F:
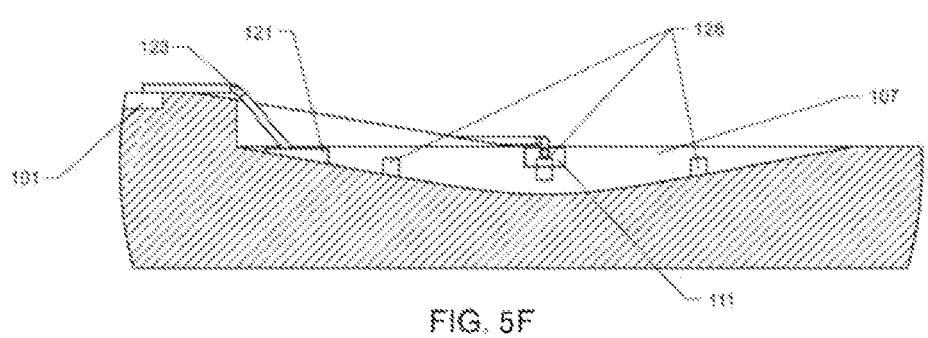
FIG. 5F is a detailed view of detail F of FIG. 5B.
Figure 5G:
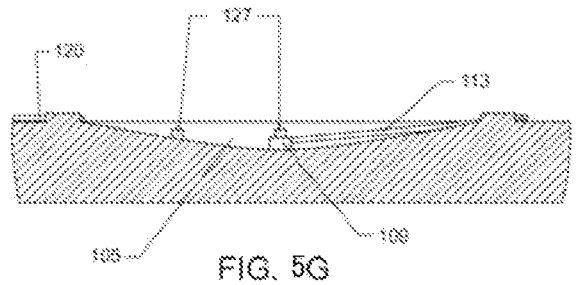
FIG. 5G is a detailed view of detail G of FIG. 5C.
Figure 5H:
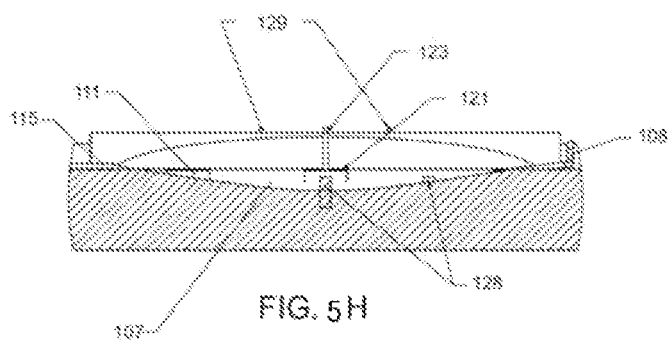
FIG. 5H is a detailed view of detail H of FIG. 5D.

Any type of plants, crops, trees, etc. can be grown in the grow field. For the purpose of this disclosure and claims any term related to a specific type of living organism intended to be grown, including plants, crops, trees or similar terms may be used interchangeably. For example, rice, sugar cane, tomato, eggplant, banana, pomegranate, figs, orange, lemon, lime, grapes, mango, coconut palm, and dates. It should be understood, that these are examples, and this is not an exhaustive list. Advantageously, the system provides more temperate conditions compared to the surrounding environment. More specifically, the water circulation keeps the water cool in the summer and warmer in the winter enabling healthy root growth all year. The proposed system is intended for use with any hydroponic medium, without the use of soil. In one embodiment, aggregate is provided in the grow field 101 as a natural growing medium for the plants. Any type of growing beds, rafts, structures known in the art may be used to support the desired crop and growing medium, e.g. aggregate. The aggregate may be any hydroponic medium, including but not limited to coconut coir, perlite, vermiculite, rock wool, expanded clay, gravel, or similar. In one embodiment, the first and second reservoirs 105 and 107 respectively, are positioned at opposite ends of the grow field 101. Detailed views of the first and second reservoirs are illustrated in FIGS. 3 and 4. In an embodiment, the grow field bottom surface is sloped towards the first reservoir 105, allowing water to flow and fill the grow field sufficiently.

As another aspect of the present invention, waste from rabbits is used as the source of nutrients for the cultivated plants or crops. The use of rabbit wastes is more effective for producing tailored nutrients for each type of crop, as rabbits are more versatile with their feed in comparison to other animals which means careful choosing of the feed may provide the requisite nutrients for the crops. For example, feeding rabbits with a high calcium diet when the crops need calcium levels. Rabbits produce four times more nutrients than that produced by livestock such as cows or horses, and twice as much as chicken. In addition, rabbits are easier to manage and require less space, and the associated waste is easier to manage and introduce into the second water reservoir 107 to dilute into the water over time. Further, an external rabbit facility can over produce without directly effecting the water conditions considering that such facilities may be stored and introduced as part of the cultivation system—as and when needed.

In another embodiment, the first reservoir 105 is configured for fish harvesting, while the second reservoir 107 is configured to be used as a settling tank for large fish waste. In some embodiments, the second reservoir may also be used to harvest shrimp, an ecological way to further reduce fish waste and large particles such as fish scales. Advantageously, shrimp feed on the fish waste producing smaller more water soluble waste.

Fish waste contains ammonia, which is oxidized into a nitrite that acts as a fertilizer for the crops and trees. This oxidation process is natural and happens through ammonia-oxidizing bacteria. Ammonia and the nitrites are toxic to fish. Therefore, the ammonia level must be carefully monitored and controlled. Excess ammonia must be removed from the reservoir or tank before it injures the fish. In addition to monitoring the ammonia, the pH of the water must remain in a specified range, depending on the specific fish species. Normally, the pH will be near 7.0, or neutral. Also, the salinity will need to be monitored, as natural salts may form in the water. In order to have a productive cultivation system, the needs of the crops and trees must be balanced with the needs of the fish in such a way to remain profitable. Accordingly, the proposed cultivation system of the present invention is advantageous for arid climates and areas with poor soils. The present invention uses less water than traditional farming and places the roots of the crops and trees in the nutrient-rich water. Experimentation utilizing the present invention shows rice and other crops can be grown in arid environments, with only a fraction of the water used compared to traditional farming. Furthermore, the nutrient-rich water eliminates the need to chemically fertilize the soil or leave a field to fallow, and the present invention is void of complicated or expensive equipment to operate.

Referring to FIGS. 2-4, the proposed cultivation system 100 further comprises a first water pump 109 positioned at the center of the first reservoir 105, wherein the first pump 109 is submersible and configured to collect animal waste and water. A first conduit 113 is connected to the first pump 109. In some embodiments, the first conduit 113 extends across the system to the second reservoir 107 via a first outlet 108. Likewise, a second pump 111 is provided in the second reservoir 107, wherein the second pump 111 is connected to a second conduit 115 leading to a bio filtration system 117. In one embodiment, the bio filtration system 117 includes helpful biological agents configured to remove harmful bacteria from the water. A third conduit 119 extends from the bio filtration system 117 to the first reservoir 105 via a second outlet 120. In one embodiment, the second pump 111 is positioned towards the perimeter end of the second reservoir 107. In some embodiments, a third pump 121 is provided in the second reservoir 107 having a fourth conduit 122 extending to the grow field 101/103 via a third outlet 123. In one embodiment, the third pump 121 is positioned near the surface of the water in the second reservoir 107 towards the perimeter edge of the second reservoir approximate to the grow field 101.

In another embodiment of the present invention, a plurality of air stones (127 or 128) configured to oxygenate the water are positioned in the first and second reservoirs 105 and 107. An air blower 125 is configured to provide the oxygen through the air stones as well known in the art. The number of air stones may vary as needed. In addition, the cultivation system 100 includes natural features that create water oxygenation and purification, such as the continuous flow of water and other features that will be discussed in further detail below. In some embodiments, best seen in FIG. 2, an external drainage siphon system 129 is provided between the first reservoir 105 and the grow field 101, wherein the siphon system is configured to drain the grow field 101 to a desired level (volume or height) when filled.

Figure 6:
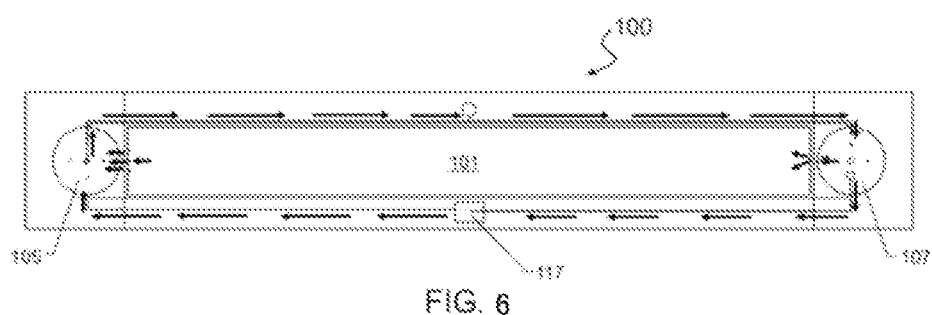
FIG. 6 is a top view of the animal waste based cultivation system illustrating the flow direction during operation according to an embodiment of the present invention.
Figure 7:
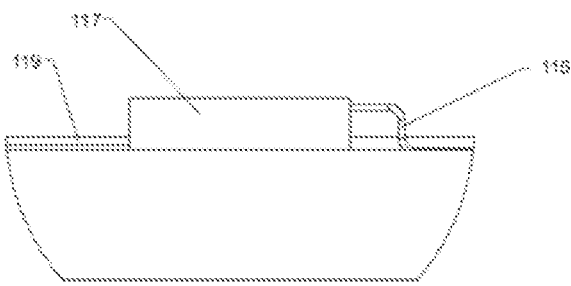
FIG. 7 is a detailed side view of the bio filtration system according to an embodiment of the present invention.

FIGS. 5A-H illustrate various details of the cultivation system 100 via section and elevation views giving a sense of height to the components and structure of the system. FIG. 6 is a top view of the proposed cultivation system 100 illustrating the flow direction during operation. As previously mentioned, the continuous circulation of the water keeps a temperate water temperature for the plants. Further, the continuous water circulation reduces water consumption up to 90% compared to traditional growing methods making the system of the present invention ideal for arid and dry climates. Also, the large scale and total volume of water used in the system or plurality of systems assists in transpiration due to water evaporation into the atmosphere, very helpful for arid and dry climates subjected to droughts.

Referring now to any FIGS. 2-7, during operation, the water is circulated in a clockwise direction continuously throughout the system from the first reservoir 105 to the second reservoir 107, to the grow field 101 and bio filtration system 117 and back to the first reservoir 105. The fish provided in the first reservoir 105 are fed natural and organic foods, and in turn the waste they produce is pumped out to the first conduit 113 via the first pump 109. As well known in the art, fish waste is toxic to the fish and needs to be removed to provide a healthy environment. Next, the water and fish waste travels through the first conduit 113 and out the first outlet 108 into the second reservoir 107. The second reservoir 107 act as a settling tank for large fish waste. In some embodiments, shrimp are provided in the second reservoir 107 as they eat the fish waste and other larger particles such as fish scales, producing smaller more soluble waste. The shrimp in second reservoir 107 can also be used as fish feed which means that the present system can run sustainably eventually without introducing feed. Next, the water and smaller waste particles travel through the second conduit 115 via the second pump 111 leading to the bio filtration system 117. The second pump 111 is close to the surface of the water to prevent larger particles from being pumped.

Simultaneously, the water and animal waste travel through the third conduit 119 via the third pump 121 out the third outlet 123 and into the grow field 101, supplying the plants with the animal waste, which is a rich fertilizer. The bio filtration system 117 is configured to remove harmful bacteria, animal/fish waste, algae, and other biological contaminants before the water travels back to the first reservoir 105 via conduit 119 and the second outlet 120. Water may also flow into the first reservoir 105 via the siphon system 129. In addition to maintaining water quality, the bio filtration system, helps break down the animal/fish waste via *nitrobacter* bacteria. The bio filtration system 117 is a very useful component ensuring an efficient cultivation system beneficial to both the plants and fish.

The present invention provides an ecosystem for birds, insects, and microorganisms in dry, arid, desert environments without big water requirements. In some embodiments, ducks may be provided in the system as they act as a natural pest control, while eating insects, larvae, and also providing fertilizer to the plants. Depending on the crop or plant, the ducks may also feed off dried plant stalks and branches which help reduce maintenance. Yet further, the continuous circulation of water, including the continuous flooding and draining of the grow field leads to healthier roots which provides health plants and crops compared to traditional soil grown plants. Advantageously, the two reservoir system provides the benefits discussed above, i.e. providing and ensuring enough nutrition is readily available for the plants while producing healthy environments for shrimp and fish, and in addition to the two reservoirs provides a built-in backup reservoir in case of malfunctions in the one of the reservoirs. In alternative embodiments, the two reservoirs may run two separate plant or crop cycles via a single system.

Figure 8:
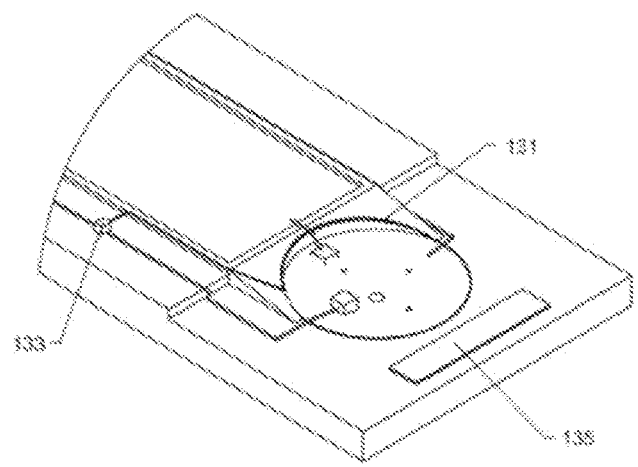
FIG. 8 is a detailed perspective view of the second reservoir of the animal waste based cultivation system according to an embodiment of the present invention.

Due to the system's efficiencies, yield and harvest times of plants and crops are enhanced due to the readily available nutrition and oxygenated water which can lead to extra harvests compared to traditional growing methods. Although not directly illustrated, it should be understood that any instrumentation or devices configured to monitor water quality and environmental conditions, including but not limited to temperature, salinity, pH, ammonia levels, ppm, nutrient levels, and bacteria may be provided. Further, any electrical equipment and/or power devices configured to provide power to any components of the system may be provided. Referring now to FIG. 8, a detailed perspective view of an alternate second reservoir of the cultivation system 100 is shown. In some embodiments, a water holding tank 133 is provided, wherein the water holding tank is configured to reroute a portion of the water flow directly back into the second reservoir 107 via conduit 131. Advantageously, conduit 131 is wrapped around the reservoir having multiple openings (not illustrated) creating a waterfall effect configured to increase oxygen levels in the water. Although illustrated in the second reservoir, this may also be provided to the first reservoir 105 to increase oxygen levels in the water. In some embodiments, one or more solar panel modules 135 may be provided to create and store electrical energy to power the pumps, air blower, and any other component that requires power to operate. In another embodiment of the present invention, floating solar panel modules 135 are installed on the first and second reservoirs of the cultivation system of the present invention, thereby generating sufficient solar energy to run the cultivation system, as well as for regulating the water temperature during hot and cold months. Also present is a tent or canopy 136 over the cultivation system 100 (covering the system comprising reservoirs, conduits and filtration unit) for condensing any evaporated water, thereby minimizing loss and boosting sustainability and productivity of the cultivation system.

Figure 9:
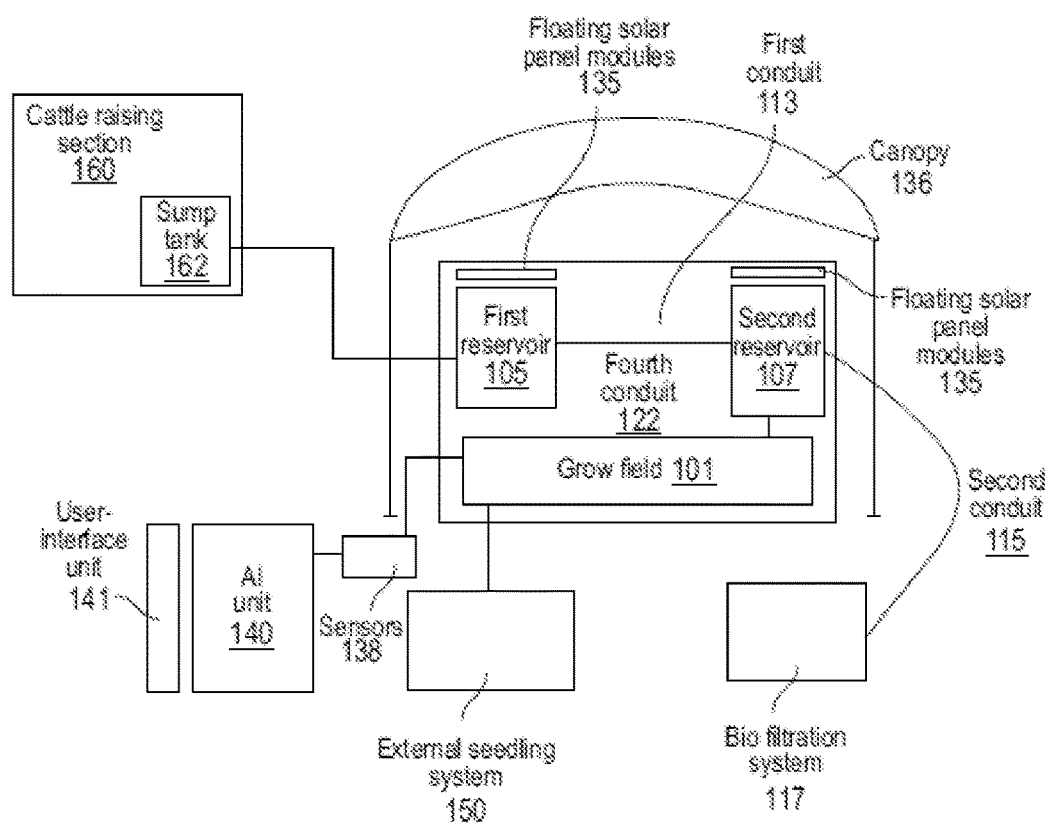
FIG. 9 is a perspective view of several embodiments of the animal waste based cultivation system according to the present invention.

As depicted in FIG. 9, the cultivation system in accordance with the present invention, wherein the plurality of sensors (or a sensor unit) 138 continuously monitors a level of requisite nutrients within the grow field 101. In another embodiment, real-time monitoring of the flowing or circulated water, temperature and relative humidity of the surrounding atmosphere as well as a temperature of the flowing or circulated water—is conducted to ensure healthy roots all year round, irrespective of the environmental temperature (summer or winter). In another embodiment of the present invention, the Artificial Intelligence (AI) unit 140 and machine-learning algorithm 144 is used to analyze plant/crop sustainability and monitor growth rate by using parameters values recorded using the plurality of sensors (such as amount or a level of nutrients in the growth medium (or soil), temperature, transpiration, humidity, dust, presence of pests or insect, etc.). It is a primary objective of the present invention that the ground temperature is constantly maintained at a nominal temperature of 25-26 degrees Celsius round the year. Accordingly, in another embodiment, the plurality of conduits or pipes utilized in the cultivation system of the present invention are run or built underground, thereby providing an insulation for the plurality of conduits or pipes and enabling regulating temperature of the circulated water during hot or cold months. The AI unit 140 monitors relevant parameters of the growth media in combination with the surrounding environment and provides a feedback regarding an action which needs to be taken to ensure or maintain healthy plant or root growth, for example, increase or reduce water circulation rate, more nutrients required, etc.

In another embodiment of the present invention, the ambient climate of the cultivation system 100 is cooled down by surrounding the area with a plurality of removed palm tree fronds to create a cooling wall rather than cardboard which is traditionally used in greenhouses, which are constantly wet via a drip irrigation system (a system which allows water to drip slowly to the roots of plants, either from above the soil surface or buried below the surface, aiming to place water directly into the root zone and minimize evaporation)—which keeps the palm fronds wet. Accordingly, when there is wind circulation in the area, the constantly wet palm fronds cool down the wind and thereby the surrounding area is also cooled down.

The rate of water evaporation occurring during summer months increases substantially and leads to increased salt levels in the circulated water (owing to the closed water cycle, salt is left behind once water evaporates). This increased salt level affects plant growth and in certain cases, health of some plant or crop species. As a solution to this problem, a desalination (or reverse osmosis) plant is installed within the proposed system. The desalination plant is either installed within the piping/conduit network of the system, or considering a more economic approach—a separate evaporation and condensation system is operated wherein water is evaporated (using natural heat during summer months and induced heat during winter months), leaving behind salt—and this evaporated water is condensed and used/circulated within the cultivation system. In another embodiment of the present invention, saline water (or water rejected from the desalination plant) is used for salt water crop irrigation or routed to another pond to raise marine water fish.

In another embodiment of the present invention, the proposed cultivation system 100 comprises an external seedling system 150. The external seedling system 150 or arrangement comprises a plurality of smaller grow-beds wherein seeds are sown initially. Once the seedlings begin to sprout and are semi-mature, these are transplanted to the main grow field through which water is constantly circulated to promote healthier root or plant growth. This allows enhancing the overall outcome and productivity of the grow field, considering that seeding can commence a few weeks prior to harvesting the current yield and thereby, gain more yield cycles per calendar year.

As another aspect of the present invention, is a livestock or cattle raising section 160 in conjunction with the cultivation system of the present invention comprising a cattle-shed connected with a surface with a downward slope towards a sump or settle tank 162—which acts as a settling area for cow or sheep manure and urine (being a natural substance this will not affect fish health). The cattle feed on produce or feed grown via the cultivation system 100. An added advantage of linking the cultivation system with the livestock or cattle raising section 160 is revenue-based, focusing also on dairy and meat products from the system. Using a concrete base with a slope downwards towards the sump tank 162 allows ease of collecting cattle-shed waste via high water pressure (water thereby being introduced into the proposed cultivation system from the cattle-shed) from a first end of the cattle-shed towards the other end—which forces the cattle-shed waste and additional water content into the sump tank 162. This cattle-shed waste is then allowed to be diluted with water and then transported to the cultivation system 100 via a water pump. The addition of livestock waste into the proposed cultivation system further requires a fermentation tank wherein the cattle-shed waste is allowed to settle and a mixing mechanism is introduced to speed up the dilation process. Cattle waste collects in the settle tank 162 and is mixed with water and fed into the system, thereby acting as both water refill and extra nutrients. Using both fish waste and rabbit/cattle waste provides the plants with sufficient nutrients keeping the process organic and insuring optimum growth and yield.

The specific features are disclosed as exemplary preferred forms of implementing the claimed invention. Stated otherwise, it is to be understood that the phraseology and terminology employed herein, as well as the abstract, are for the purpose of description and should not be regarded as limiting. Therefore, while exemplary illustrative embodiments of the invention have been described, numerous variations and alternative embodiments will occur to those skilled in the art. Such variations and alternative embodiments are contemplated, and can be made without departing from the spirit and scope of the invention. It should further be noted that throughout the entire disclosure, the labels such as left, right, front, back, top, bottom, forward, reverse, clockwise, counter clockwise, up, down, or other similar terms such as upper, lower, aft, fore, vertical, horizontal, oblique, proximal, distal, parallel, perpendicular, transverse, longitudinal, etc. have been used for convenience purposes only and are not intended to imply any particular fixed direction or orientation. Instead, they are used to reflect relative locations and/or directions/orientations between various portions of an object. In addition, reference to "first," "second," "third," and etc. members throughout the disclosure (and in particular, claims) are not used to show a serial or numerical limitation but instead are used to distinguish or identify the various members of the group.

Many changes, modifications, variations and other uses and applications of the subject invention will become apparent to those skilled in the art after considering this specification and the accompanying drawings, which disclose the preferred embodiments thereof. All such changes, modifications, variations and other uses and applications, which do not depart from the spirit and scope of the invention, are deemed to be covered by the invention, which is to be limited only by the claims which follow.

What is claimed is:

1. A system for cultivating plants or crops, comprising:
   a grow field configured to support plant or crop cultivation, the grow field comprising a first end, a second end, a bottom surface and a boundary wall,
   a first reservoir proximate to the first end of the grow field, wherein the first reservoir is configured to produce a waste nutrient stream;
   a second reservoir proximate to the second end of the grow field, wherein the second reservoir is configured to act as a settling tank for the produced waste nutrient stream;
   an Artificial Intelligence (AI) unit in connection with the grow field, first reservoir and the second reservoir for providing a feedback for improving a growth rate of the cultivated plants or crops;
   a controller in communication with the AI unit for receiving and processing output signals from at least one sensor and sending an assessment of a plurality of monitored parameters to the AI unit, based on the processed output signals; and
   a first pump positioned in the first reservoir;
   a first conduit in fluid connectivity with the first pump and the second reservoir;
   a second pump positioned in the second reservoir;
   a third pump positioned in the second reservoir;
   a second conduit in fluid connectivity with the second pump and a bio filtration system;
   a third conduit in fluid connectivity with the bio filtration system and the first reservoir; and,
   a fourth conduit in fluid connectivity with the third pump and the grow field.

2. The system of claim 1, wherein the first reservoir is configured to hold a plurality of fish and the produced waste nutrient stream comprises fish waste.

3. The system of claim 1, wherein the first reservoir is in connection with a sump tank positioned proximate to a livestock or rabbit shed, which is configured to store manure and urine from the livestock or rabbits.

4. The system of claim 3, wherein the produced waste nutrient stream is manure and urine from livestock or rabbits diluted in water.

5. The system of claim 1, wherein a growth medium within the grow field is an aggregate material used as a replacement for soil, the aggregate medium being a hydroponic medium.

6. The system of claim 5, wherein the plurality of monitored parameters comprises levels of requisite nutrients in the growth medium, temperature, transpiration, humidity, pH, water conductivity, dissolved oxygen, dust, presence of pests or insects.

7. The system of claim 6, wherein the at least one sensor continuously monitors levels of requisite nutrients in the growth medium.

8. The system of claim 7, wherein the at least one sensor is a soil nutrient sensor, optical sensor which function using reflectance spectroscopy, an electromagnetic sensor, and/or a dust sensor.

9. The system of claim 5, wherein the hydroponic medium comprises coconut coir, perlite, vermiculite, rock wool, expanded clay or gravel.

10. The system of claim 5, wherein the feedback provided by the AI unit comprises an indication regarding detected low levels of nutrients in the growth medium or an indication to increase or reduce overall water circulation rate.

11. The system of claim 1, wherein the first, second, third and fourth conduits are submerged and function underground for regulating a temperature of water circulated via the first, second, third and fourth conduits.

12. The system of claim 11, wherein the water circulation is continuous and in a clockwise direction.

13. The system of claim 1, further comprising a plurality of floating solar panels installed on the first and second reservoirs of the system for generating solar energy and for regulating temperature of water circulated through the system, and a tent positioned over the grow field, the first and the second reservoir for condensing any evaporated water.

14. The system of claim 1, further comprising an external seedling system comprising a plurality of grow-beds wherein seeds are sown initially, and are transplanted to the grow field once sprouted, for enhancing overall productivity of the grow field.

15. The system of claim 1, wherein the bottom surface of the grow field is sloped from a second end to a first end enabling water to flow and fill the grow field from the second reservoir.

16. The system of claim 1, further comprising an air blower and a plurality of air stones positioned in the first and second reservoirs, wherein the plurality of air stones are configured to continuously oxygenate the water.

* * * * *